March 31, 1953 W. F. CAHOON 2,633,163
SAWMILL DOG
Original Filed Aug. 8, 1949 3 Sheets-Sheet 1

INVENTOR.
WILLIAM F. CAHOON
BY
Jennings & Carter
ATTORNEYS

INVENTOR.
WILLIAM F. CAHOON
BY
Jennings & Carter
ATTORNEYS

March 31, 1953 — W. F. CAHOON — 2,633,163
SAWMILL DOG
Original Filed Aug. 8, 1949 — 3 Sheets-Sheet 3
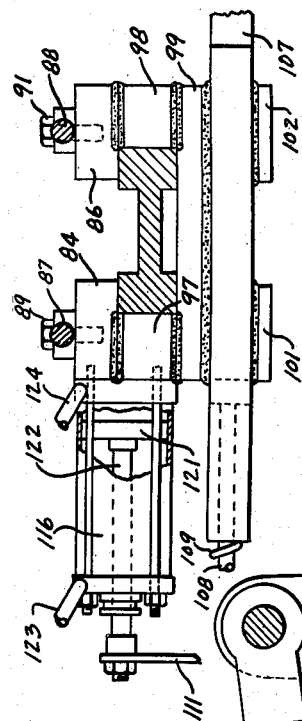
Fig. 5
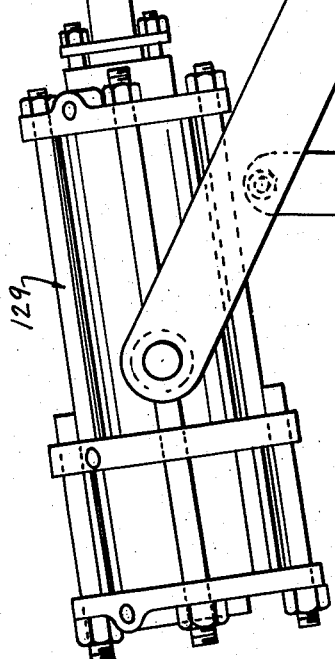
Fig. 6
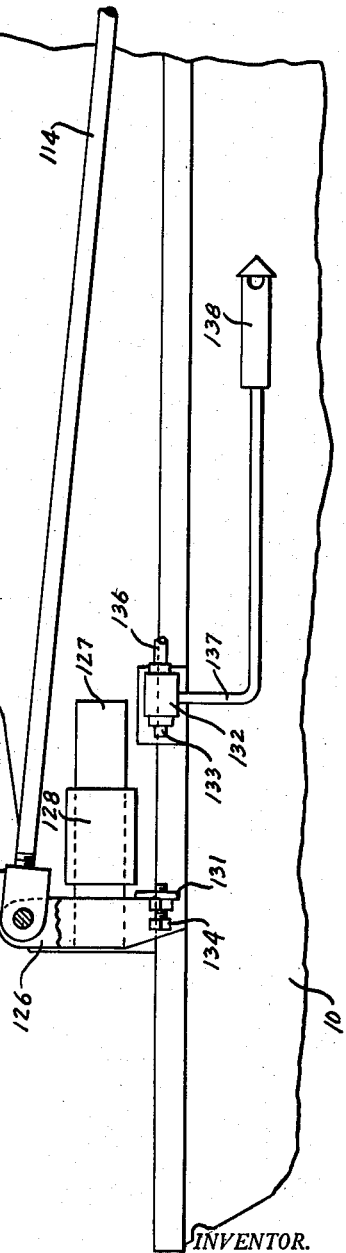
INVENTOR.
WILLIAM F. CAHOON
BY
Jennings & Carter
ATTORNEYS Patented Mar. 31, 1953

2,633,163

UNITED STATES PATENT OFFICE 2,633,163

SAWMILL DOG

William F. Cahoon, Birmingham, Ala.; Una Thomas Cahoon, executrix of said William F. Cahoon, deceased Original application August 8, 1949, Serial No. 109,131, now Patent No. 2,626,640, dated January 27, 1953. Divided and this application December 15, 1950, Serial No. 201,015

4 Claims. (Cl. 143—126)

This is a division of my co-pending application, Serial No. 109,131 filed August 8, 1949, now Patent No. 2,626,640, and relates to that type of log and lumber dogging apparatus which is operative by fluid pressure and has for one of its objects the provision of apparatus of the character designated which shall be so constructed that the weight of all the dogging mechanism, except the guide for the dog bar cases and its supporting members is transferred to the center of the head block and in which the dog cases, dogs, and dog movement cylinders are disposed on the outside of the knee, affording accessibility and ease of maintenance.

A further object of my invention is to provide dogging apparatus together with improved means for mounting and moving the dogs inwardly and outwardly of the dog case, together with improved means for compensating for wear between the dog case and the dog case guide bar.

Still another feature of my invention is the provision of an improved means for warning the operator whenever the lower dog approaches an unsafe limit of travel forwardly of the dog case.

Apparatus embodying features of my invention is illustrated in the accompanying drawings, forming a part of this application, in which:

Fig. 5 is a sectional view taken along the line V—V of Fig. 1; and

Fig. 6 is a side elevational view showing the rear portion of the knee and the safety operating mechanism for the lower dog.

Figure 1:
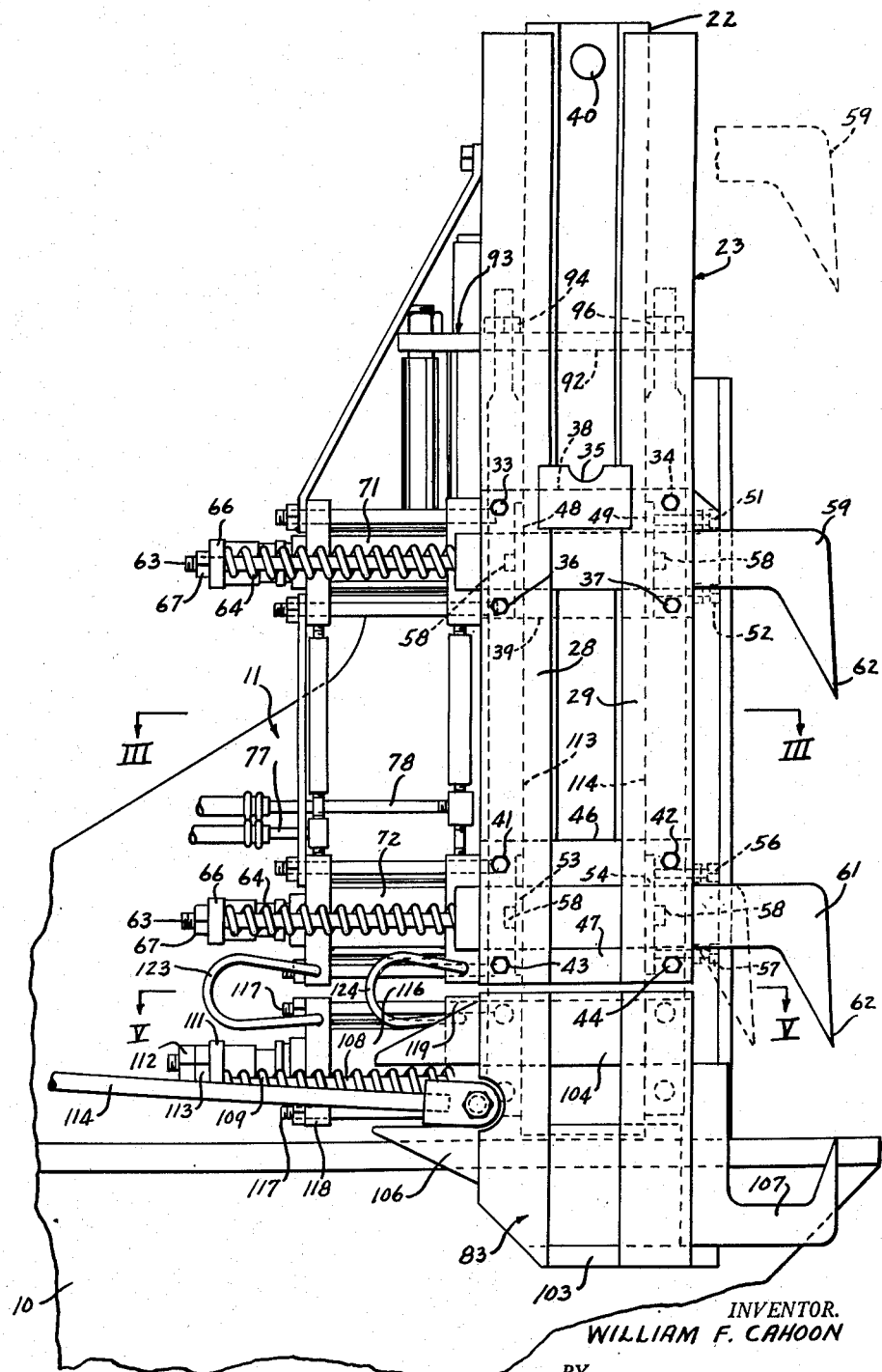
Fig. 1 is a side elevation showing the forward portion of the knee with the dogging apparatus.

Referring now to the drawings for a better understanding of my invention, I show a fragment 10 of a head block on which is mounted a hollow knee 11, the knee being movable on the head block, forwardly and rearwardly, in a manner well understood and which needs no description.

Figure 2:
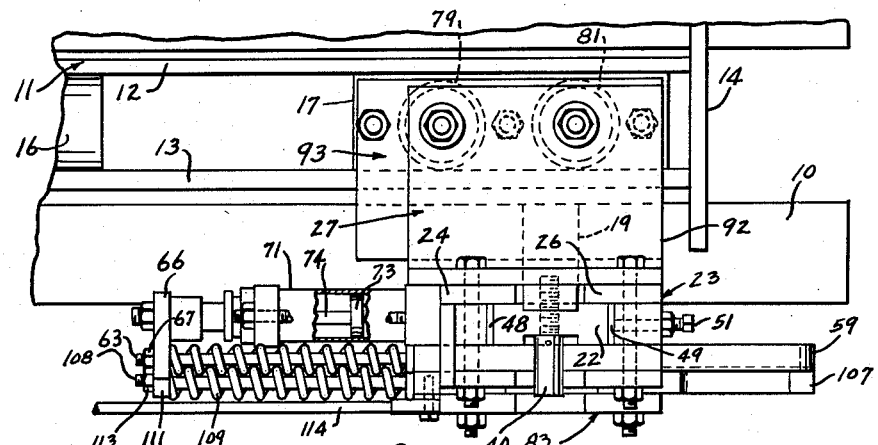
Fig. 2 is a plan view of the apparatus.
Figure 3:
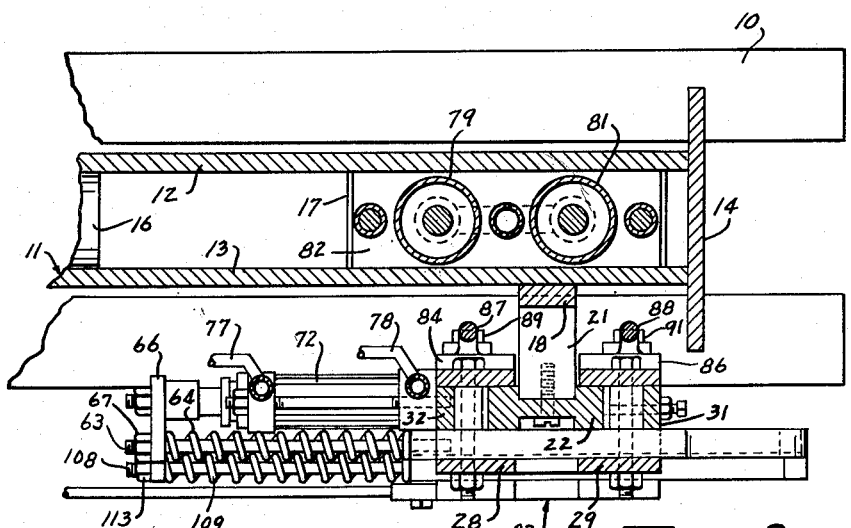
Fig. 3 is a sectional view taken along the line III—III of Fig. 1.

As shown in Figs. 2 and 3, the knee consists of two side plates 12 and 13 which are joined together at the front by a face plate 14 and at the rear by a cross member 16. A cylinder support or base plate 17 extends across between the side plates 12 and 13, and is joined to both of said plates by welding or otherwise.

Attached to the side plate 13 of the knee is a bracket 18 having an upper arm 19 and a lower arm 21, to which is secured a dog case guide bar 22 which extends from the top to bottom of the knee.

Mounted on, and vertically movable with respect to the guide bar, is an upper dog case 23. The dog case is comprised of two inner side plates 24 and 26 which are spaced apart to straddle the arms 19 and 21, and permit vertical movement of the case. The plates 24 and 26 are joined together at the top by an operating bracket 27. The outer side of the upper dog case is comprised of two flat spaced bars 28 and 29 and the front and rear by flat bars 31 and 32. The front and rear bars 31 and 32 are joined to the inner bars 24 and 26 by welding and the inner and outer bars are joined together by a suitable number of bolts 33, 34, 36 and 37 which support the upper dog bar guides 38 and 39. They are also joined together by bolts 41, 42, 43, and 44, which support the intermediate dog bar guides 46 and 47. As shown in Fig. 3 of the drawing, the dog bar guides are positioned outside, or beyond, the dog case guide bar 22 and thereby do not interfere with the vertical movement of the dog case on the guide bar 22. Mounted within the dog case 23 between the end members 31 and 32, and bearing against the dog case guide bar 22, are gibs 48 and 49. Similar gibs 53 and 54 are mounted alongside the intermediate dog bar guides 46 and 47. Each of the gibs is provided on its outer side with a pin 58 which fits within a suitable recess in the dog case to hold it in position. The gib 49 may be adjusted inwardly of the dog case by means of set screws 51 and 52, and the gib 54 may be similarly adjusted by means of set screws 56 and 57. By the means shown, the wear of the guide bar 22 and the gibs may be compensated. Vertical movement of the dog case 23 on the dog case guide bar 22 is limited by means of a stop block 35 which is disposed to engage a pin 40 on the guide bar at the upper limit of travel of the dog case.

Figure 4:
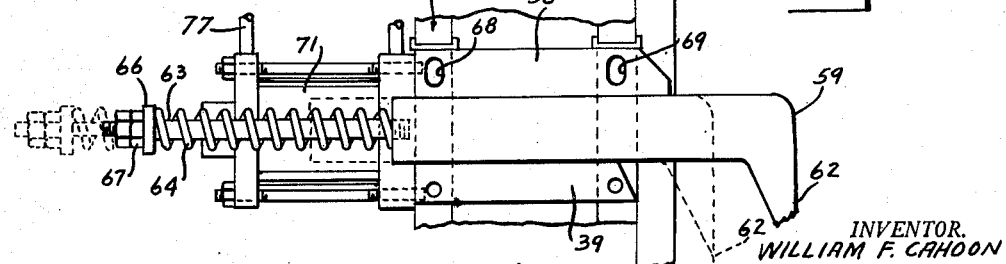
Fig. 4 is a detail view of the upper dog with the side plate of the dog case removed.

Mounted between the dog bar guides 38 and 39 is an upper dog 59 and mounted between the intermediate dog bar guides 46 and 47 is an intermediate dog 61. Each of the dogs 59 and 61 is provided with a down turned dogging point 62. Joined to each of the dogs 59 and 61 is a rearwardly extending rod 63. A spring 64 surrounds the rod 63 and the rod extends rearwardly through a cross head 66 and is slidable with respect thereto. The cross head 66 bears against the spring 64 and nuts 67 on the outer end of the rod provide means to adjust the innermost position of the dog. As shown in Fig. 4 of the drawing, the dog bar guides are mounted in the dog case by means of bolts passing through slotted holes 68 and 69 thereby providing means for compensating for wear of the dogs and the guides.

The upper dog 59 and the intermediate dog 61 are moved inwardly and outwardly by means of air cylinders 71 and 72 which are similar in construction and operation and only one need be described. Mounted within the cylinder 71 is a piston 73 to which is connected a piston rod 74 having the cross head 66 mounted on the outer end thereof. Air is admitted to opposite sides of the piston 73 through conduits 77 and 78 in a manner well understood to cause the piston to move inwardly or outwardly. It will be seen that, with the construction described, in event a log or other piece of timber comes against the outer end of either of the dogs 59 or 61, it will be pushed inwardly, compressing the spring 64 against the cross head 66 and thereby preventing damage to the dog. It will also be seen that whatever the position of the dogs, except when pushed inwardly by timber, the tension on the springs surrounding the dog rods is the same.

The dog case 23 is raised and lowered on the dog case guide bar 22 by means of two air cylinders 79 and 81 which are movably mounted in the knee 11 between the side walls thereof on the base plate 17. A rubber cushion 82 is interposed between the lower ends of the cylinders and the base plate 17 to cushion movements of the cylinder with respect to the knee. Further description of the means for producing vertical movement of the dog case 23 is not given herein since it forms no part of this application.

Mounted on, and movable vertically with respect to the dog case guide bar 22, is a lower dog case 83. As shown in Fig. 5, the lower dog case is comprised of two spaced parallel steel plates 84 and 86 on the inner side, which are connected to bars 87 and 88 by means of studs 89 and 91. As shown in Figs. 1 and 2, the bars 87 and 88 extend upwardly and are joined at their upper ends to an extension 92 on an upper cylinder head 93. The bars 87 and 88 are cylindrical at their upper ends and are threaded as shown to be joined to the extension 92 by means of adjusting nuts 94 and 96 whereby the initial position of the lower dog case with respect to the knee can be varied. As shown in Fig. 5 of the drawing, the bars 84 and 86 overlap the dog case guide bar 22. Joined to the bars 84 and 86 and bearing against the sides of the guide bar 22 are guide blocks, or gibs 97 and 98. Joined to the guide blocks 97 and 98 is an inner guide plate 99. Outer plates 101 and 102 are joined to the plate 99 by a lower spacer block 103, upper dog bar guide 104 and an intermediate dog bar guide 106.

Mounted in the lower dog case just described is a lower dog 107, which, as shown in Fig. 1 is Z-shaped in side elevation so that it bears on the lower spacer block 103 and lies between the intermediate guide 106 and upper guide 104. Secured to the rear end of the dog 107 is a rod 108 having a spring 109 surrounding it in the same manner as the dogs already described. The outer end of the rod 108 is threaded and passes through a cross head 111 having a slidable fit with respect thereto. Adjusting nuts 112 and 113 are screwed onto the outer ends of the rod 108 to adjust the initial position of the dog. Also secured to the rear end of the dog 107 is a rod 114 forming a part of a safety device to be described in detail hereinafter.

The lower dog 107 is moved inwardly and outwardly of the dog case 83 into dogging position by means of an air cylinder 116 as shown in Figs. 1 and 5, which is mounted on the lower dog case. The cylinder 116 is secured to the dog case by means of studs 117 which pass from end to end of the cylinder through heads 118 and 119 and into the dog case, on the outside of the cylinders, and secure the heads 118 and 119 against separation. Mounted in the cylinder 116 is a piston 121 having a piston rod 122. Secured to the outer ends of the piston rod is the plate, or cross head 111 which is slidably connected to the dog rod 108 and bears against the spring 109. Air is admitted to opposite ends of the cylinder 116, as required, by means of air conduits 123 and 124 in a manner well understood. The conduits 123 and 124 as shown, are relatively long and flexible whereby upon separation of the upper and lower dog cases, the air connections are not broken.

Referring now to Fig. 6, together with Fig. 1, I show in detail the construction and operation of the lower dog safety limit device. The rod 114 is connected to a movable cross head 126 which has connected thereto and extending forwardly therefrom a rectangular bar 127. The bar 127 fits slidingly within a guide 128 secured to the side of the knee 11 at the rear thereof. At 129 is indicated a tapering mechanism mounted on the knee 11, which forms no part of my present invention. Accordingly it is not described in detail. Extending outwardly from the cross head 126 is a bracket 131 which moves forwardly and rearwardly with the cross head. Mounted on the head block is a valve case 132 having a plunger 133 extending rearwardly therefrom in the path of movement of the bracket 131. A set screw 134 extends through the bracket 131 to engage the stem 133. Air is admitted to the housing 132 by means of a conduit 136 and, upon opening of the valve by means of the valve stem 133 escapes through a conduit 137. When this occurs, a whistle 138, connected to the conduit 137 is blown to warn the operator that the lower dog has reached the safe outward limit of its travel. Also, when this occurs, the bracket 131 engages the housing 132 and further forward movement of the lower dog is prevented. While I have shown an air operated cylinder and a whistle as the warning signal it will be obvious however that other well known forms of warning signal may be employed.

From the foregoing description, the operation of my improved dogging apparatus will be readily understood. With a piece of timber placed against the face plate 14 of the knee between the lower dog 107 and one of the dogs 59 or 61, as the case may be, depending upon the thickness of the timber, the dogs are moved forwardly, if necessary, to dogging position whereby they can engage the timber. With the dogs in position to engage the timber, air is admitted to the upper ends of the cylinders 79 and 81 to force the pistons downwardly carrying with them the bracket 27 and dog case 23 to lower the dogs 59 and 61. As soon as the dog 59 or 61, as the case may be, engages the timber, its further downward movement is arrested and the action of the air against the upper ends of the cylinders 79 and 81, raises the cylinders off their support carrying with them the extensions 92, the lower dog case lift bars 87 and 88 and the lower dog case 83, thereby to raise the lower dog 107 to engage the lower side of the timber. When it is desired to release the timber, or move the dogs to another position, air is admitted to the lower ends of the cylinders 79 and 81 whereupon the pistons move upwardly, taking the bracket 27 and dog case 23, and disengaging the upper dogs from the timber. At the same time the lower dog 107 is released from the timber.

From the foregoing, it will be seen that with the cylinders 79 and 81 located between the side walls of the knee, and the dog cases and dogs supported from the cylinders, that all the weight of the apparatus is transferred to the head block centrally of the knee. The only weight carried by the knee and laterally thereof is the weight of the dog case guide bar 22. The positioning of the upper and lower dog cases outside the knee renders them readily accessible for adjustment and maintenance which is a very important item in the operation of a sawmill. It will thus be seen that I have provided improved dogging apparatus which is simple and sturdy of construction, and which is readily adjusted and maintained.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In timber dogging apparatus, a dog case, a dog mounted in the case for rectilinear movement forwardly and rearwardly thereof in a substantially horizontal plane, a pneumatic cylinder mounted in the case alongside the dog and having a piston therein with a piston rod movable outwardly and inwardly of the cylinder in a substantially horizontal plane, a cross head mounted rigidly on the piston rod extending laterally therefrom to the rear of the dog, a rod on the dog extending rearwardly therefrom through the cross head and positioned outwardly of the dog case, there being an opening in the cross head in which the rod slidingly fits, a spring surrounding the rod between the cross head and the dog and biasing the dog outwardly of said dog case, and adjusting nuts on the rear end of the rod for varying the innermost position of the dog with respect to the dog case.

2. In timber dogging apparatus, a hollow knee, a vertically extending dog case guide bar supported from and positioned on the outside of the knee, a dog case slidably mounted for vertical movement on the dog case guide bar and comprising inner and outer side walls, a dog mounted for rectilinear movement in the dog case to move forwardly and rearwardly therein in a substantially horizontal plane, horizontally extending dog guide bars mounted in the dog case outwardly of said dog case guide bar, and means to adjust vertically the position of the dog guide bars in the dog case.

3. In timber dogging apparatus, a dog case, a dog mounted in the case for rectilinear movement forwardly and rearwardly thereof in a substantially horizontal plane, a pneumatic cylinder mounted in the case alongside the dog and having a piston therein with a piston rod movable outwardly and inwardly of the cylinder in a substantially horizontal plane, a cross head mounted rigidly on the piston rod extending laterally therefrom to the rear of the dog, a rod on the dog extending rearwardly therefrom passing slidably through the cross head and positioned outwardly of the dog case, a spring surrounding the rod between the cross head and the dog and biasing the dog outwardly of said dog case, and a stop for said cross head on the rear end of said rod.

4. In timber dogging apparatus, a hollow knee, a vertically extending dog case guide bar supported from and positioned on the outside of the knee, a dog case slidably mounted for vertical movement on the dog case guide bar and comprising side walls and end members, a dog mounted for rectilinear motion in the dog case and adapted to move forwardly and rearwardly therein in a substantially horizontal plane, horizontally extending dog guide bars mounted in the dog case outwardly of said dog case guide bar, means to adjust vertically the position of the dog guide bars in the dog case and adjusting means interposed between said dog case guide bar and said end members adapted to move said dog case horizontally with respect to said dog case guide bar.

WILLIAM F. CAHOON.

REFERENCES CITED

The following references are of record in the file of this patent:

UNITED STATES PATENTS

| Number | Name | Date |
| --- | --- | --- |
| 158,693 | Ferry | Jan. 12, 1875 |
| 303,967 | Ackerman | Aug. 26, 1884 |
| 470,289 | Christman | Mar. 8, 1892 |
| 473,658 | Doyle et al. | Apr. 26, 1892 |
| 1,009,376 | Bayles | Nov. 21, 1911 |
| 1,293,336 | Christopher | Feb. 4, 1919 |
| 1,839,713 | Tanner | Jan. 15, 1932 |
| 1,944,285 | Haase | Jan. 23, 1934 |
| 1,944,287 | Langill | Jan. 23, 1934 |
| 2,104,299 | Grundstein | Jan. 4, 1938 |
| 2,318,163 | Kahr | May 4, 1943 |
| 2,342,946 | Le Tourneau | Feb. 29, 1944 |